UNITED STATES PATENT OFFICE.

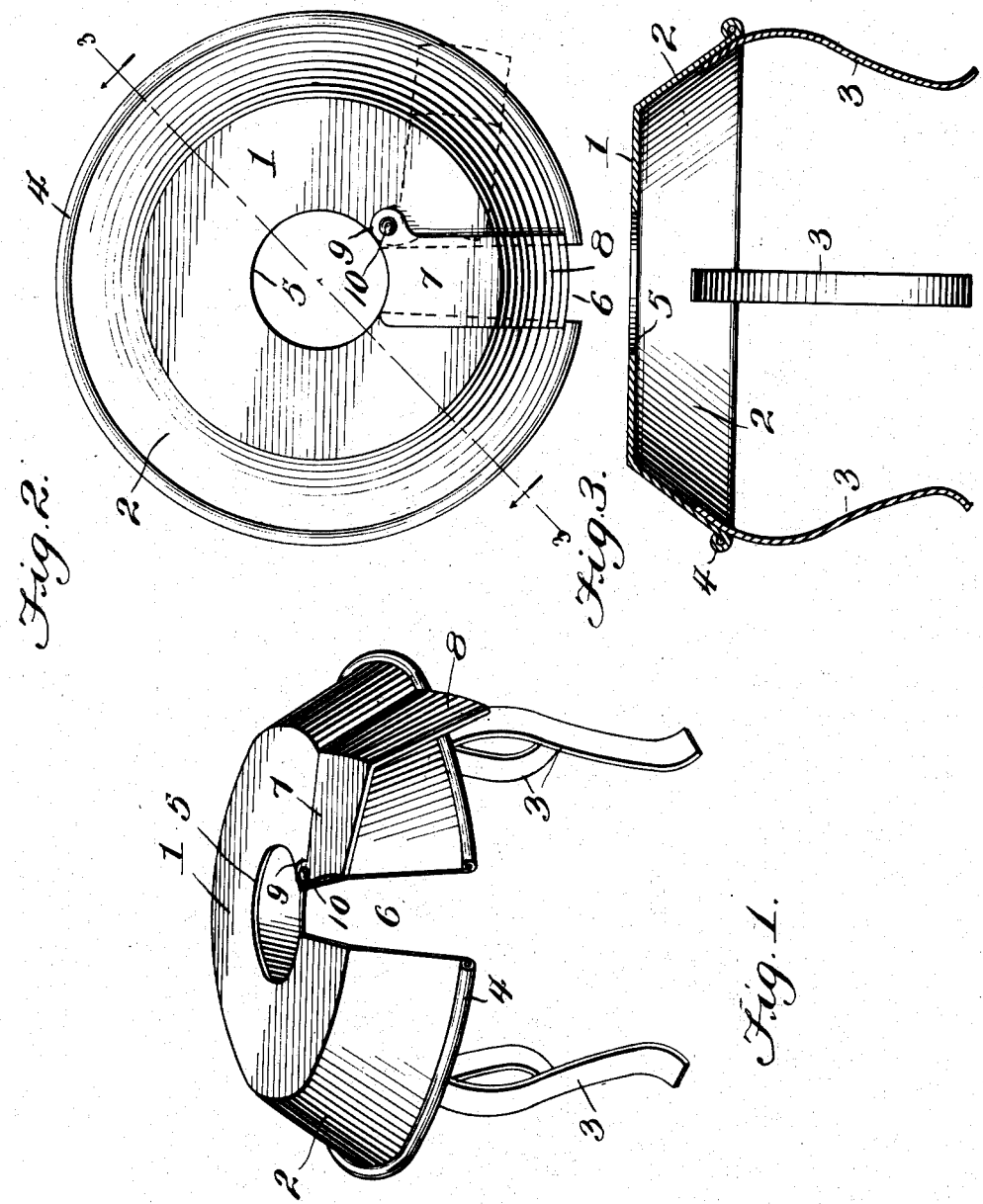

MABEL B. BARRON, OF CAMDEN, MAINE.

COVER FOR CREAM-BOWLS.

No. 909,052.      Specification of Letters Patent.      Patented Jan. 5, 1909.

Application filed September 29, 1908. Serial No. 455,256.

*To all whom it may concern:*

Be it known that I, MABEL B. BARRON, citizen of the United States, residing at Camden, in the county of Knox and State of Maine, have invented new and useful Improvements in Covers for Cream-Bowls, of which the following is a specification.

This invention relates to covers or guards for bowls or other vessels, the object of the invention being to provide a device especially adapted for use in connection with cream bowls, to enable the cream to be whipped without danger of the same flying and escaping during the whipping operation, the device being so constructed as to adapt it to bowls of different sizes and shapes and the device being also adapted by reason of its construction for use in connection therewith of cream whippers of different sizes and shapes.

With the above and other objects in view, the invention consists in the novel construction, combination and arrangement of parts as herein fully described, illustrated and claimed.

In the accompanying drawings:—Figure 1 is a perspective view of the cover or guard showing the gate thereof open to receive the cream whipper. Fig. 2 is a plan view of the same, showing the gate open in full lines and closed in dotted lines. Fig. 3 is a diametrical section through the same.

The main body of the cover or guard is of frusto-conical shape, that is to say, it comprises a substantially flat top 1 and a cone-shaped downwardly flaring rim or flange 2 adapted to fit snugly over the top of the bowl or other receptacle and to form a comparatively tight joint with such bowl, also adapting the cover to fit with the necessary precision on bowls of different sizes.

Extending downward from the body of the cover at suitable intervals around the rim thereof is a plurality of reversely curved spring arms 3 which are adapted to embrace the sides of the bowl or vessel and retain the cover or guard securely in place thereon without additional aid. The lower edge of the rim or flange 2 is also preferably reinforced by forming the same with a roll or bead as shown at 4.

The cover or guide is provided with a central opening 5 in the flat top thereof to provide for the manipulation of the whipper and extending outward from said central opening entirely through the flat top and one side of the rim or flange 2 is a gate-way 6, which after the whipper has been introduced into its proper position is closed by means of a pivoted gate which comprises a flat upper portion 7 adapted to complete the top 1 and a downwardly extending inclined portion 8 adapted to cover the portion of the gate-way formed in the flange 2. The lower edge of the gate is adapted to snap into engagement with the head 4 when closed thereby retaining the same in a closed position.

At one of its upper corners the gate is provided with a pivot lug 9 which receives the pivot 10 connecting the same with the body of the cover or guard.

The guard or cover hereinabove described is thus adapted to vessels or bowls of different sizes, but is adapted to admit of the reception and removal of cream whippers of different sizes and shapes. The device will be found very convenient to the housekeeper and also very economical in that it prevents any material loss of cream during the whipping operation.

I claim:—

1. A cover or guard for the purpose described comprising a substantially flat top with a central opening, a downwardly flaring or conical flange, a gate-way leading from the central opening outward through the side of the cover or guard, a gate for opening and closing said gate-way, and retaining means for holding said cover or guard in position on a vessel, substantially as described.

2. A guard or cover for the purpose specified comprising a frusto-conical body embodying a substantially flat top provided with a central opening and a conical or downwardly flaring flange surrounding the same, a pivot gate adapted to open and close said gate-way, and a series of spring arms extending downward from said cover and arranged at intervals in the circumference thereof, substantially as and for the purpose specified.

In testimony whereof I affix my signature in presence of two witnesses.

MABEL B. BARRON.

Witnesses:
     ARTHUR R. HALFORD,
     ELMER DRINKWATER.